United States Patent [19]
Nissen

[11] Patent Number: 5,816,732
[45] Date of Patent: Oct. 6, 1998

[54] CABLE CONNECTION DEVICE

[76] Inventor: Carl-Erik M. Nissen, P.O. Box 51, Port McNeill, BC, Canada, V0N 2R0

[21] Appl. No.: 795,914

[22] Filed: Feb. 5, 1997

[51] Int. Cl.⁶ ........................................................ B25G 3/18
[52] U.S. Cl. ............................ 403/327; 403/155; 403/78; 403/165
[58] Field of Search ................................ 403/327, 78, 79, 403/164, 165, 154, 155, 150, 157, 254, 256, 257, 294, 292; 294/1.1; 24/114.5, 129 W

[56] References Cited

U.S. PATENT DOCUMENTS

| | | |
|---|---|---|
| 1,861,908 | 6/1932 | Culp ........................................ 403/78 X |
| 2,011,208 | 8/1935 | Williams . |
| 2,625,005 | 1/1953 | Myers ...................................... 403/78 X |
| 2,740,000 | 3/1956 | Wierk ..................................... 403/165 X |
| 3,044,812 | 7/1962 | Giovinazzo . |
| 3,102,743 | 9/1963 | Niskin . |
| 3,466,073 | 9/1969 | Pohle ..................................... 403/326 X |
| 3,490,799 | 1/1970 | Shreeve .................................. 403/78 X |
| 4,552,481 | 11/1985 | Bluett ..................................... 403/78 X |
| 4,570,987 | 2/1986 | Wong et al. . |
| 4,708,382 | 11/1987 | LaCount ................................. 403/78 X |
| 5,127,764 | 7/1992 | Baer ...................................... 403/316 |
| 5,193,419 | 3/1993 | Lee . |
| 5,393,162 | 2/1995 | Nissen . |

*Primary Examiner*—Kenneth J. Dorner
*Assistant Examiner*—William L. Miller
*Attorney, Agent, or Firm*—Graybeal Jackson Haley LLP

[57] ABSTRACT

A connection device for use with a cable includes a link member to permit connection to another article and a housing formed in the link member having a passage therethrough including an annular cavity of larger diameter than the passage. There is a shaft member fixedly mountable to a cable and insertable into the housing passage. The shaft member is formed with an external annular groove. A clip member is mountable in the external annular groove. The connection device is assembled by insertion of the shaft member through the housing passage in a first longitudinal direction to expose the annular groove. The clip member is mounted in the exposed annular groove of the shaft member and the shaft member is retracted into the housing passage in the opposite longitudinal direction to pivotally and releasably connect the link member and the shaft member by virtue of the clip member rotatably engaging in the annular cavity of the housing passage. The connection device of the present invention permits easy replacement or repair if the link member is ever damaged.

7 Claims, 1 Drawing Sheet

CABLE CONNECTION DEVICE

FIELD OF THE INVENTION

This invention relates to a cable connection device.

BACKGROUND OF THE INVENTION

Connection and joint assemblies are well known in mechanical systems to permit strong and reliable attachment of one part to another. Applicant's own U.S. Pat. No. 5,393,162 discloses a joint assembly that accommodates pivoting movement. Examples of additional prior patents that are directed generally to connection devices are listed below:

U.S. Pat. No. 2,011,208 to Williams;

U.S. Pat. No. 4,570,987 to Wong et al.; and

U.S. Pat. No. 5,193,419 to Lee.

A specialized area of connection devices involves cable connection assemblies. Cables are commonly used to connect together remote parts of a mechanical device in order to transmit forces between the parts. Cable connection devices are generally designed to establish a strong and reliable link point at the end of a cable to permit coupling of the cable to an anchor point.

Unique problems are encountered when designing cable connection devices. Cables tend to twist in their normal operating state under tension, and it is therefore desirable that a cable connection device be designed to accommodate this twisting. Cables also tend to stretch during use and it is important that a cable connection device incorporate some system to allow for cable stretch. Examples of cable connection devices known to applicant that address the foregoing design considerations are shown in U.S. Pat. No. 3,044,812 to Giovinazzo and U.S. Pat. No. 3,102,743 to Niskin.

It is applicant's observation that the most common cable connection arrangement is use today, particularly in heavy industry, is still the well known design that involves folding and clamping the end of the cable back on itself to create an obround loop for hooking to an anchor point. Often a curvilinear metal wear plate is fitted into the loop to prevent the cable in the loop from wearing out and fraying after prolonged use. The advantage of this loop design is its simplicity, however, it does not address the problems of cable twist or stretch outlined above.

SUMMARY OF THE INVENTION

Applicant has developed an inexpensive and elegant solution to the problem of a cable connection device that is simple in both construction and use and that accommodates cable stretch and twisting.

Accordingly, the present invention provides a connection device for use with a cable comprising:

a link member to permit connection to another article;

a housing formed in the link member having a passage therethrough including an annular cavity of larger diameter than the passage;

a shaft member fixedly mountable to a cable and insertable into the housing passage, the shaft member being formed with an external annular groove; and a clip member mountable in the external annular groove whereby insertion of the shaft member through the housing passage in a first longitudinal direction to expose the annular groove, mounting of the clip member in the exposed annular groove of the shaft member and retraction of the shaft member into the housing passage in the opposite longitudinal direction serves to pivotally and releasably connect the link member and the shaft member by virtue of the clip member rotatably engaging in the annular cavity of the housing passage.

The connection device of the present invention permits easy replacement or repair if the link member is ever damaged. The device allows for relative rotation of the attached cable and the link member to accommodate twisting of the cable. In addition, by forming a plurality of annular grooves on the shaft member, the length of a cable can be quickly and easily adjusted by inserting the clip member into a selected groove.

BRIEF DESCRIPTION OF THE DRAWINGS

Aspects of the present invention are illustrated, merely by way of example, in the accompanying drawings in which.

DESCRIPTION OF THE PREFERRED EMBODIMENTS

Figure 1:
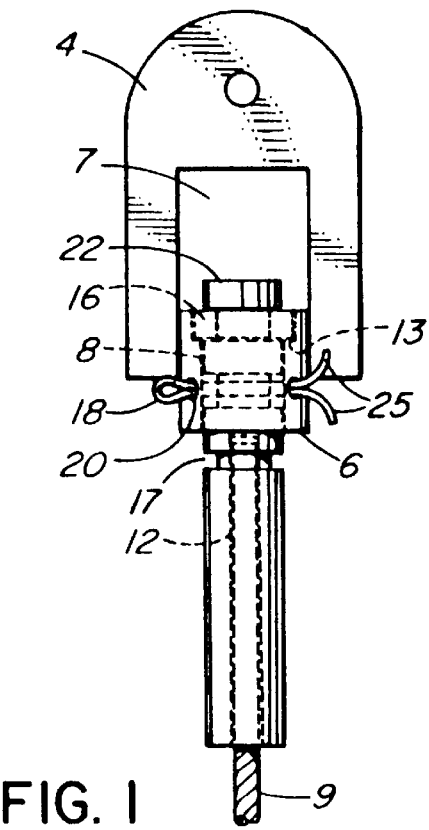
FIG. 1 is an assembled view of a preferred embodiment of the connection device of the present invention.
Figure 3:
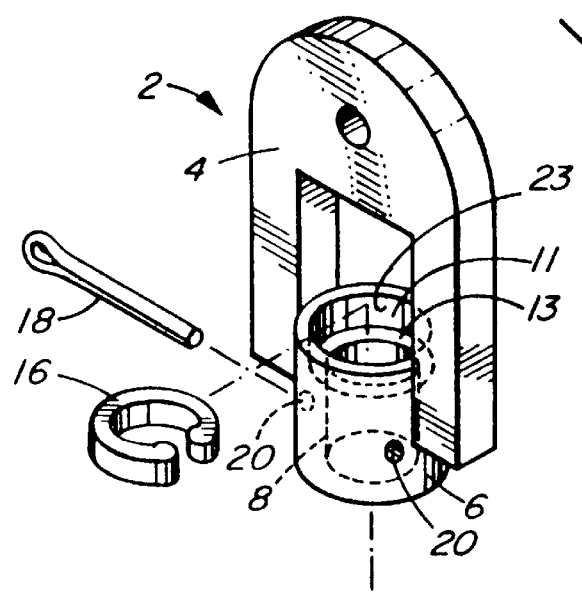
FIG. 3 is an exploded view of the embodiment of FIGS. 1 and 2 showing its constituent parts.
Figure 3:
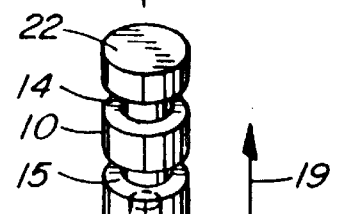
Figure 3:

Referring to FIGS. 1 and 3, there is shown a cable connection device 2 according to a preferred embodiment of the present invention. The connection device includes a link member 4 extending from a central housing 6. In the illustrated embodiment, link member 4 is generally U-shaped and co-operates with central housing 6 to define an opening 7 that can be hooked over a cable anchoring point (not shown). It will be readily apparent that link member 4 is not limited to the specific shape illustrated, and any shape, such as a hook, loop or clevis member, to permit connection to an anchor point can be used with the connection device of the present invention.

As best shown in FIG. 3, central housing 6 in link member 4 has a passage 8 extending therethrough. Passage 8 is generally cylindrical and includes an annular cavity 11 of larger diameter than the passage to define a shoulder 13 at end of passage 8 adjacent opening 7.

Passage 8 is dimensioned to slidably and rotatably receive shaft member 10. Shaft member 10 includes an internal longitudinally extending cavity 12 to receive a cable 9. Preferably, cable 9 is inserted into cavity 12 and shaft member 10 is press fitted onto cable 9 to firmly attach the cable to shaft member 10. Other suitable methods of attaching shaft member 10 to cable 9 including riveting or welding are also possible.

In the illustrated embodiment, shaft member 10 is formed with a plurality of external annular grooves 14, 15 and 17. One of these annular grooves is intended to receive a clip member 16 when the connection device of the present invention is assembled.

The manner in which the connection device of the present invention operates is best understood by following the steps for its assembly. Referring to FIG. 3, shaft member 10 is inserted upwardly through passage 8 in housing 6 as indicated by arrow 19 to protrude into opening 7. Clip member 16 is then mounted into a selected one of grooves 14, 15 or 17. Shaft member 10 is then retracted downwardly through passage 8 until newly mounted clip member 16 engages in annular cavity 11 of passage 8. Shoulder 13 provides a bearing surface against which clip member 16 can rotate to create a pivotable and releasable connection between link member 4 and shaft member 10 with attached cable 9. Relative rotary movement of shaft member 10 in passage 8 accommodates any twisting of cable 9.

Figure 2:
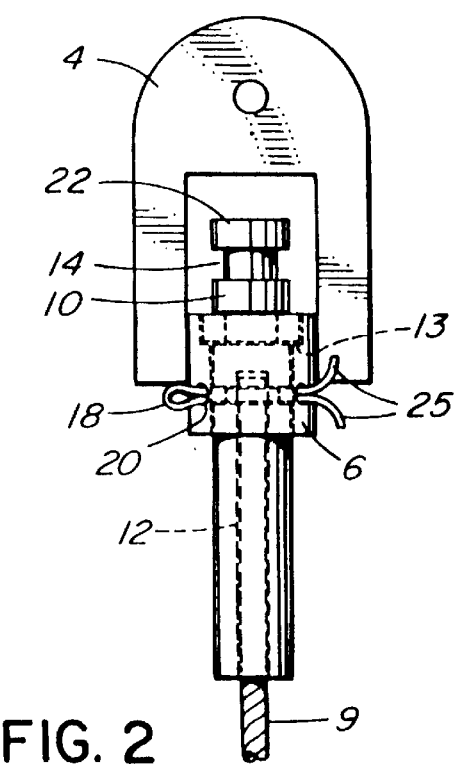
FIG. 2 is an assembled view similar to FIG. 1 except the connection device has been adjusted to effectively shorten the length of cable.

A plurality of grooves are provided in shaft member 10 to permit adjustment in the effective length of cable 9 by allowing for variation in the extent to which shaft member 10 is inserted into and retained in passage 8. For example, FIG. 1 shows an assembled connection device according to the present invention in which clip member 16 has been mounted into annular groove 14 and the head 22 of shaft member 10 extends only a short distance into opening 7. In FIG. 2, clip member 16 is mounted in groove 15 and shaft head 22 extends further into opening 7. The effective length of attached cable 9 (including connection device 2) is shorter in FIG. 2 than in FIG. 1 by virtue of the positioning of clip member 16 in different annular grooves of shaft member 10.

Preferably, for ease of use and installation, clip member 16 is a split washer. When retracted into cavity 11, the cavity side walls 23 retain the split washer in the selected annular groove of shaft member 10. Furthermore, since cable 9 will generally be in a state of tension, there will generally be a force on shaft member 10 urging it away from opening 7 such that clip member 16 is urged against shoulder 13 and retained in cavity 11.

In the event that the connection device of the present invention is not used in an environment where cable 9 is always under tension, lock passage 20 and locking pin 18 can be used. Lock passage 20 extends through housing 6 to intersect housing passage 8. As best shown in FIGS. 1 and 2, locking pin 18 is insertable through the lock passage to engage the shaft member to prevent longitudinal movement of the shaft member in housing passage 8. Preferably, locking pin 18 is a cotter pin whose ends 25 are bent outwardly to retain the pin in place in the locking passage. A spring pin or bolt can also be used as a locking pin 18.

In addition, lock passage 20 is spaced below housing cavity 11 such that locking pin 18 will engage in an annular groove of shaft member 10 below the groove into which clip member 16 is mounted. For example, in FIG. 1, clip member 16 is mounted in groove 14 and locking pin 20 engages in groove 15. In FIG. 2, clip member 16 is mounted in groove 15 and locking pin 20 engages in groove 17.

Although the present invention has been described in some detail by way of example for purposes of clarity and understanding, it will be apparent that certain changes and modifications may be practised within the scope of the appended claims.

I claim:

1. A connection device for use with a cable comprising:

a link member to permit connection to another article;

a housing formed in the link member having a passage therethrough including an annular cavity of larger diameter than the passage;

a shaft member fixedly mountable to the cable and insertable into the housing passage, the shaft member being formed with a plurality of external annular grooves along the shaft length; and a clip member mountable in a selected one of the plurality of external annular grooves upon insertion of the shaft member through the housing passage in a first longitudinal direction to expose one or more of the plurality of annular grooves, whereby retraction of the shaft member into the housing passage in the opposite longitudinal direction serves to pivotally and releasably connect the link member and the shaft member by virtue of the clip member rotatably engaging in the annular cavity of the housing passage, the plurality of external annular grooves to receive the clip member providing for adjustment of the position of the link member and the housing on the shaft member.

2. A connection device as claimed in claim 1 in which the clip member is a split washer.

3. A connection device as claimed in claim 1 including a lock passage through the housing that intersects the housing passage and a locking pin insertable through the lock passage to engage the shaft member to prevent longitudinal movement of the shaft member in the housing passage.

4. A connection device as claimed in claim 3 in which the locking pin engages in one of the plurality of external annular grooves of the shaft member.

5. A connection device as claimed in claim 3 in which the locking pin is a cotter pin.

6. A connection device as claimed in claim 1 in which the shaft member includes a longitudinally extending cavity to receive the cable.

7. A connection device as claimed in claim 6 in which the shaft member is adapted to be pressed onto the cable.

* * * * *